United States Patent
Wang et al.

(10) Patent No.: US 8,792,312 B1
(45) Date of Patent: Jul. 29, 2014

(54) METHOD AND SYSTEM FOR PROVIDING AN ENERGY ASSISTED MAGNETIC RECORDING HEAD

(71) Applicant: Western Digital (Fremont), LLC, Fremont, CA (US)

(72) Inventors: Lei Wang, Danville, CA (US); Dujiang Wan, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/888,768

(22) Filed: May 7, 2013

Related U.S. Application Data (62) Division of application No. 12/751,883, filed on Mar. 31, 2010, now Pat. No. 8,607,439.

(51) Int. Cl.
  *G11B 11/00* (2006.01)
(52) U.S. Cl.
  USPC ....... 369/13.33; 369/13.13; 360/59; 360/121; 29/603.16
(58) Field of Classification Search
  USPC .......... 369/13.33, 13.32, 13.24, 13.14, 13.03, 369/13.02, 13.13, 13.22, 112.27; 360/59, 360/110, 121, 122, 125.31; 29/603.16, 29/603.11; 216/62, 65
  See application file for complete search history.

(56) References Cited

U.S. PATENT DOCUMENTS

| | | | |
|---|---|---|---|
| 6,455,398 B1 | 9/2002 | Fonstad, Jr. et al. | |
| 7,203,387 B2 | 4/2007 | Doan | |
| 8,012,804 B1 | 9/2011 | Wang et al. | |
| 8,024,748 B1 | 9/2011 | Moravec et al. | |
| 8,134,794 B1 | 3/2012 | Wang | |
| 8,254,212 B2 * | 8/2012 | Snyder et al. | 369/13.33 |
| 8,451,556 B1 | 5/2013 | Wang et al. | |
| 8,607,439 B1 | 12/2013 | Wang et al. | |
| 2008/0049563 A1 | 2/2008 | Konno et al. | |
| 2010/0328807 A1 | 12/2010 | Snyder et al. | |

OTHER PUBLICATIONS

Interview Summary dated May 7, 2012 from U.S. Appl. No. 12/751,883, 2 pages.
Ex parte Quayle dated Sep. 21, 2012 from U.S. Appl. No. 12/751,883, 6 pages.
Notice of Allowance dated Jan. 31, 2013 from U.S. Appl. No. 12/751,883, 17 pages.
Notice of Allowance dated Aug. 16, 2013 from U.S. Appl. No. 12/751,883, 14 pages.

* cited by examiner

*Primary Examiner* — Ali Neyzari (57) ABSTRACT

A method and system for providing an energy assisted magnetic recording (EAMR) head are described. The method and system include providing a slider, an EAMR transducer coupled with the slider, and a top layer on the slider. The top layer includes a mirror well therein and has a substantially flat top surface. The method and system further includes providing a laser including a light-emitting surface and providing a mirror optically coupled with the laser. The laser is coupled to the top surface of the top layer external to the mirror well. The mirror has a bottom surface and a reflective surface facing the light-emitting surface of the laser. A portion of the bottom surface of the mirror is affixed to the top surface of the top layer. A portion of the mirror resides in the mirror well.

9 Claims, 12 Drawing Sheets

METHOD AND SYSTEM FOR PROVIDING AN ENERGY ASSISTED MAGNETIC RECORDING HEAD

CROSS-REFERENCE TO RELATED APPLICATIONS

This application is a divisional of U.S. patent application Ser. No. 12/751,883 entitled METHOD AND SYSTEM FOR PROVIDING AN ENERGY ASSISTED MAGNETIC RECORDING HEAD, assigned to the assignee of the present application, and incorporated herein by reference.

BACKGROUND

Figure 1:
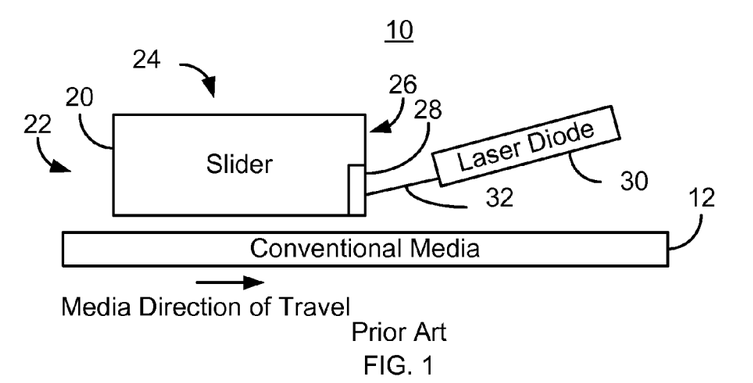
FIG. 1 is a diagram depicting a portion of a conventional energy assisted magnetic recording disk drive.

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). The conventional slider 20 has a leading edge 22, a trailing edge 26, and a back side 24. Other components that may be part of the conventional EAMR disk drive 10 are not shown. The conventional slider 20 is typically attached to the suspension at its back side 24. A conventional EAMR transducer 28 is coupled with the slider 20.

The laser diode 30 is coupled in proximity to the EAMR transducer 28 on the trailing edge 26 of the slider 20. Light from the conventional laser diode 30 is provided substantially along the optic axis of the conventional laser diode 30 to the trailing edge 26 of the slider 20. Light may be provided via an optical component 32. Although shown as a line, the optical component may be a fiber, a mirror, a lens, another optical component, or some combination thereof. Light from the laser diode 30 is provided to a grating (not shown) of conventional EAMR transducer 28. The light from the laser diode 30 coupled into the grating is then provided to a waveguide (not shown). The waveguide directs the light toward the conventional media 12, heating a small region of the conventional media 12. The conventional EAMR transducer 28 magnetically writes to the conventional media 12 in the region the conventional media 12 is heated.

Figure 2:
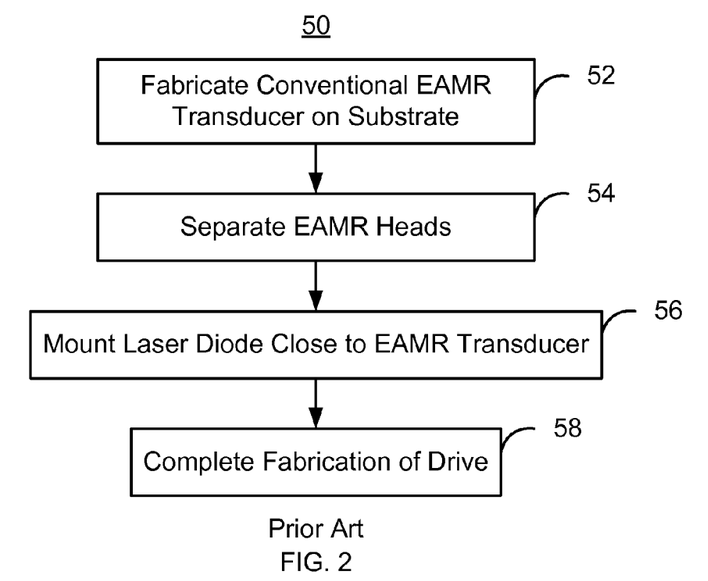
FIG. 2 is a flow chart depicting a conventional method for fabricating a conventional EAMR disk drive.

FIG. 2 depicts a conventional method 50 for fabricating a portion of the conventional EAMR disk drive 10. For simplicity, only a portion of the method 50 is described. The conventional EAMR transducer 28 is fabricated on the substrate, such as an AlTiC substrate, via step 52. Typically, a reader for the conventional disk drive 10 has already been fabricated. Thus, the conventional EAMR transducer 28 is built on other structures. Typically, multiple transducers are fabricated in parallel on the same substrate. A portion of the substrate forms the slider 20.

Once fabrication of the conventional EAMR transducer 28 is completed, the EAMR heads may then be separated, via step 54. For example, the substrate holding the EAMR transducers 28 may be diced or otherwise cut into individual sliders 20. The front side of the substrate, on which the EAMR transducer 28 is fabricated, becomes the trailing edge 26 of the slider 20. The laser diode 30 is mounted in proximity to the conventional EAMR transducer 28, via step 56. More specifically, the laser diode 30 is mounted in proximity to the trailing surface 26 of the slider 20. Further, the optical component 32 may also be aligned and affixed in place as part of step 56. Step 56 may include mounting the slider 20 and laser diode 30 to a suspension (not shown). Alternatively, the laser diode 30 may be mounted on the slider 20 before the EAMR heads are separated in step 54. The fabrication of the conventional drive 10 may then be completed.

Although the conventional EAMR disk drive 10 and method 50 may function, improvements are desired. More specifically, aligning the laser 30 and optical component 32 to the desired position with respect to the conventional transducer 28 is time consuming and prone to error. The throughput and yield of a manufacturing for fabricating the conventional EAMR disk drive 10 may thus be adversely affected. Misalignment of the laser 30 with respect to the EAMR transducer 28 may also negatively impact performance of the conventional EAMR disk drive 10.

Accordingly, what are needed are improved methods and systems for fabricating EAMR disk drives.

BRIEF SUMMARY OF THE INVENTION

A method and system for providing an EAMR head are described. The method and system include providing a slider, an EAMR transducer coupled with the slider, and a top layer on the slider. The top layer includes a mirror well therein and has a substantially flat top surface. The method and system further includes providing a laser including a light-emitting surface and providing a mirror optically coupled with the laser. The laser is coupled to the top surface of the top layer external to the mirror well. The mirror has a bottom surface and a reflective surface facing the light-emitting surface of the laser. A portion of the bottom surface of the mirror is affixed to the top surface of the top layer. A portion of the mirror resides in the mirror well. In some embodiments, the top layer further includes a heat sink cavity therein. In such embodiments, a heat sink resides in the heat sink cavity. The heat sink has a heat sink top surface that is substantially coplanar with and forms a portion of the top surface of the top layer. The laser is coupled to the heat sink.

DETAILED DESCRIPTION OF EMBODIMENTS OF THE INVENTION

Figure 3:
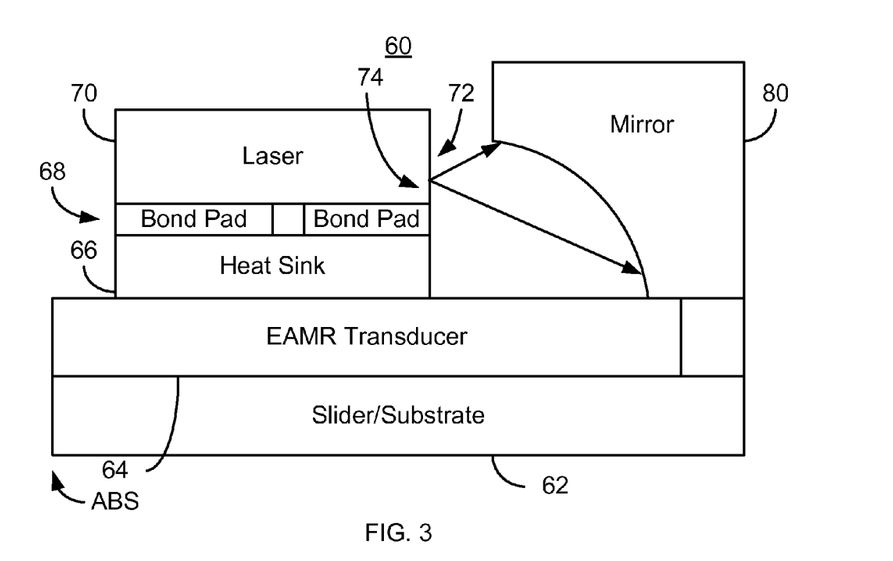
FIG. 3 is a diagram depicting a more recently developed EAMR head.

FIG. 3 is a diagram depicting a side view of a more recently developed EAMR head 60. For clarity, FIG. 3 is not to scale. The EAMR head 60 includes a slider 62, EAMR transducer 64, heat sink 66, bond pads 68, laser 70, and mirror 80. The heat sink 66 and mirror 80 are both affixed to the top of the EAMR transducer 62/slider 62. The EAMR head 60 may include read transducer(s) (not shown) and other components. The slider 62 is part of the substrate on which the EAMR transducer 64 resides. The EAMR transducer 64 is used to write to a media (not shown) oriented in proximity to the air-bearing surface (ABS). The heat sink 66 to which laser 70 is bonded via bond pads 68 assists in cooling the laser 70. The laser 70 has a light emitting surface 72 from which light is emitted at region 74. Light from the laser 70 is reflected by the mirror 80 and provided to the EAMR transducer 64. In FIG. 3, the light emitted from the laser 70 and incident on the mirror 80 is shown by arrows. However, the light reflected off of the mirror 80 is not shown.

Although the recently developed EAMR head 60 functions well for its intended purpose, alignment of the laser 70 and the mirror 80 is still complex. In particular, the mirror 80 is generally quite tall, for example on the order of twenty-five microns tall. In order to align the region 74 of the laser 70 that emits light with the mirror 80, the laser 70 is set off from the top of the EAMR transducer 64 by a significant distance. For example, the mirror 80 may have a parabolic reflective surface. Consequently, the region 74 may be desired to be at the focus of the parabola. In order to achieve this alignment, the laser 70 the heat sink 66 is tall. For example, the heat sink 66 may be approximately fifteen through seventeen microns in height. The heat sink 66, therefore, functions not only as a heat sink, but also as a pedestal for raising the height of the laser 70. The heat sink 66 is generally formed of plated copper. Plating copper to such a height may result in variations of up to one micron in the height of the heat sink 66. Such variations in the height of the heat sink 66 may adversely affect alignment of the laser 70 with the mirror 80 and thus performance of the recently developed EAMR head 60.

Figure 4:
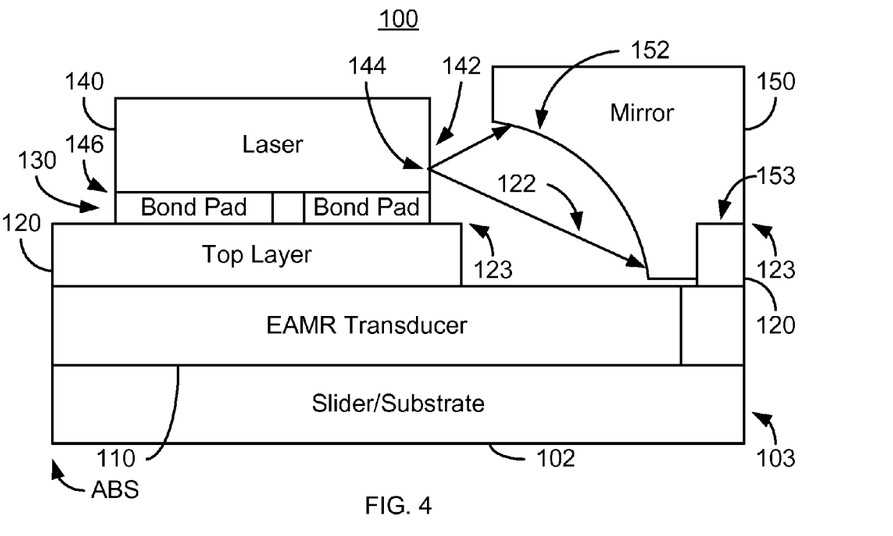
FIG. 4 is a diagram depicting an exemplary embodiment of an EAMR head.

FIG. 4 is a diagram depicting a side view of an exemplary embodiment of an EAMR head 100. For clarity, FIG. 4 is not to scale. In the embodiment shown in FIG. 4, certain components are shown. However, the EAMR head 100 may include other components, such as a read transducer (not shown). Similarly, only single components are shown. However, in other embodiments, multiple components, such as multiple EAMR transducers, lasers, and/or mirrors may be used.

The EAMR head 100 includes a slider 102, an EAMR transducer 110, a top layer 120, a laser 140, bond pads 130 or other mechanism for coupling the laser 140 to the slider 102, and a mirror 150. In some embodiments, an enclosure layer (not shown) which encapsulates part of the mirror 150 and the laser 140 may also be provided. Such an enclosure layer may protect the laser 140 and mirror 150 from damage. In some such embodiments, the mirror 150 may be integrated into the enclosure layer. The EAMR head 100 also includes an ABS which is in proximity to a recording media (not shown) during operation of the EAMR head 100.

The slider 102 includes a back side 103 through which the slider 102 may be mounted to a suspension (not shown). The EAMR transducer 110 is coupled to the slider 102. More specifically, the EAMR transducer 110 is fabricated on a substrate a part of which is used as the slider 102. The EAMR transducer 110 may include optics such as a grating, a waveguide, a near-field transducer (NFT), magnetic poles, coils, and shields. In other embodiments, additional and/or different components may make up the EAMR transducer 110. For simplicity, the components of the EAMR transducer 110 are not shown in FIG. 4.

The top layer 120 resides on the slider 102 and includes a mirror well 122 therein. The top layer 120 is shown as residing directly on the EAMR transducer 110. However, in some embodiments, there may be an intermediate layer between the top layer 120 and the EAMR transducer 110. If present, a portion of the layer receiving light from the mirror 150 is desired to be capable of transmitting light from the laser 140 without significant losses. For example, in some embodiments, such a layer includes an alumina overcoat layer. In some embodiments, the top layer 120 may be considered to include other components including but not limited to other wells or cavities (not shown). In addition, an antireflective coating (ARC) layer may be provided at the bottom of the mirror well 122. In embodiments in which an ARC layer is not used, the top of EAMR transducer 110 receiving light from the mirror 150 may be desired to have a surface roughness sufficiently small that the scattering of light is from the surface is negligible. For example, the surface roughness may not exceed five nanometers in some embodiments. In some embodiments, the top layer 120 is a layer of aluminum oxide. In other embodiments, other materials may be used. However, the top layer 120 is generally insulating. In the embodiment shown, the mirror well 122 is a through-hole in the top layer 120. However, in other embodiments, the bottom of the mirror well 122 may be a depression in the top layer 120. In some embodiments, the depth of the mirror well 122 is substantially the same as the amount by which the laser would have been offset in the EAMR head 60 depicted in FIG. 3. For example, in some embodiments, the depth of the mirror well is on the order of fifteen through seventeen microns. However, in other embodiments, the depth of the mirror well 122 may differ.

The laser 140 may be a laser diode and is coupled to the top surface 123 of the top layer external to the mirror well 122. In the embodiment shown, bond pads 130 are used to couple the laser 140 to the top surface 123. However, in another embodiment, another mechanism for coupling the laser 140 to the top surface 123 may be used. In some embodiments, coupling the laser 140 to the top surface includes coupling the laser 140 to a component (not shown in FIG. 4), such as a heat sink, that has its top offset by a distance from the top surface 123. The laser 140 includes a light-emitting surface 142 that faces the mirror 150 and a bottom surface 146. Light is emitted from region 144 of the light emitting surface 142. In FIG. 4, the light emitted from the laser 140 and incident on the mirror 150 is shown by arrows. However, the light reflected off of the mirror 150 is not shown.

The mirror 150 is optically coupled with the laser 140 and includes a reflective surface 152 and a bottom surface 153. The reflective surface 152 faces the light-emitting surface 152 of the laser. In some embodiments, the reflective surface 152 has a concave, parabolic curvature. For example, the reflective surface 152 may form a portion of a solid paraboloid. In such embodiments, the region 144 emitting the light may reside at the focus of the parabola corresponding to the curvature of the reflective surface 152. Stated differently, in such embodiments, the region 144 is aligned to be at the focal point of the parabola. A portion of the bottom surface 153 is affixed to the top surface 123 of the top layer 124 such that part of the mirror 150 including a portion of the reflective surface 152 resides in the mirror well 122.

The reflective surface 152 of the mirror 150 and the laser 140 are aligned. In some embodiments, this corresponds to the region 144 emitting the light being aligned to reside at the focus of the parabola corresponding to the curvature of the reflective surface 152. In such embodiments, the region 144 may be within one micron of the focus. In some embodiments, the region 144 may be within one-half micron from the focus. In practice, this alignment may be achieved by aligning the bottom surface 146 of the laser 140 with the bottom surface 153 of the mirror 150 to within the desired tolerance. This configuration may be achieved by aligning the bottom surface 146 of the laser 140 with the portion of the bottom surface 153 of the mirror 150 affixed to the top layer 120 to within a specified variation. Thus, the bottom surface 146 of the laser 140 and the bottom surface 153 of the mirror 150 are both aligned to the top surface 123 of the top layer 120 to within a specified variation. For example, the bottom surface 146 of the laser 140 may be some distance above the top surface 123 of the top layer 120 due to, among other components, the bond pads 130. Similarly, the portion of the bottom surface 153 of the mirror 150 affixed to the top surface 123 of the top layer 120 may be offset by another distance. As a result, there is an offset distance between the bottom surface 146 of the laser 140 and the portion of the bottom surface 153 used to affix the mirror 150 to the top surface 123. This offset distance may vary, for example due to variations in manufacturing. In some embodiments, these variations are not more than one micron. In some such embodiments, the offset distance varies by not more than one-half micron.

The laser 140 and the mirror 150 are aligned within the desired tolerances. This configuration is achieved without requiring a pedestal that raises the laser 140 a significant distance above the surface to which the mirror 150 is attached. Instead, a portion of the mirror 152 resides in the mirror well 122. Thus, alignment may be better achieved. Performance of the EAMR head 100 may thus be improved.

Figure 5:
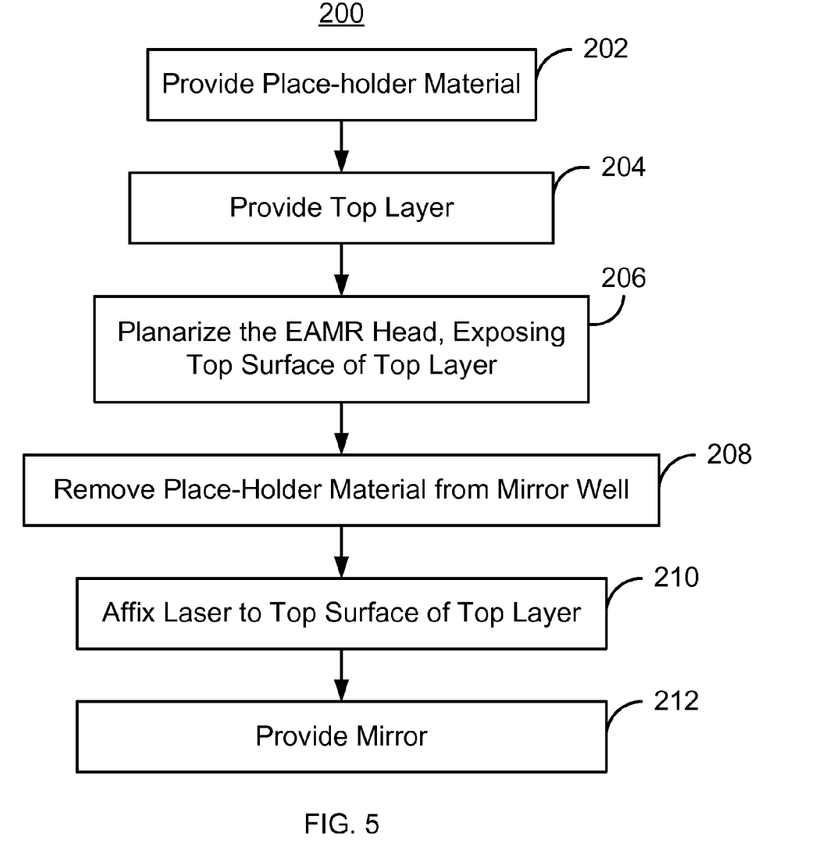
FIG. 5 is a flow chart depicting an exemplary embodiment of a method for fabricating an EAMR head.

FIG. 5 is a flow chart depicting an exemplary embodiment of a method 200 for fabricating an EAMR head. Although certain steps are shown, some steps may be omitted, interleaved, performed in another order, and/or combined. The EAMR head being fabricated may be part of a merged head, each of which includes an EAMR write transducer, a read transducer (not shown) and resides on a slider. Each EAMR head has at least one EAMR transducer on the slider. Thus, the EAMR transducer is fabricated on the substrate, or slider. The EAMR transducer includes optical components, such as gratings, waveguides, and near-field transducers (NFTs), as well as magnetic components such as poles, shields, and coils. The method 200 is described in the context of providing a single EAMR head. However, the method 200 may be used in providing multiple EAMR heads substantially simultaneously. The method 200 is also described in the context of providing particular layers and components. However, the layers and components may include sublayers and subcomponents, respectively. For simplicity, the method 200 is described in the context of the EAMR head 100 and commences after the EAMR transducer 110 has been fabricated. However, the method 200 may be used in fabricating another EAMR head.

Referring to FIGS. 4-5, a place-holder material (not shown in FIG. 4) is provided on a portion of the slider 102, via step 202. The place-holder material is at least in the location of the mirror well 122. In some embodiments, the place-holder material is wet-etchable. The place-holder material may also be desired to be thermally conductive. In some embodiments, step 202 includes plating copper in the desired location(s). Alternatively, the copper might be blanket plated, then removed in the regions from which the place-holder material is not desired. In some embodiments, the place-holder material is provided on an ARC layer in the region of the mirror well 122.

The top layer 120 is provided on the slider, via step 204. In some embodiments, step 204 is performed after step 202. Thus, a portion of the top layer may cover the place-holder material. The place-holder material naturally forms the mirror well 122. In other embodiments, the top layer 120 may be deposited and the mirror well 122 formed prior to deposition of the place-holder material.

The EAMR head 100 is planarized, exposing the top surface 123 of the top layer 120, via step 206. Step 206 may include performing a chemical mechanical planarization (CMP) of the EAMR head 100. The top surface 123 of the top layer is, therefore substantially flat. In addition, removal of some of the top layer 120 in step 206 exposes a surface of the place-holder material.

The place-holder material is removed from the mirror well, via step 208. In some embodiments, step 208 includes wet etching the place-holder material. In addition, excess place-holder material may be removed from other undesired locations. However, in locations where the place-holder material is desired, the place-holder material is covered by a mask. Wet etching the place-holder material may aid in ensuring that the bottom of the mirror well 122 is flat. However, in another embodiment, the place-holder material may be removed in another manner.

The laser 140 is affixed to the top surface 123 of the top layer 120, via step 210. Step 210 may include providing bond pads 130 and bonding the laser 140 to the bond pads. The mirror 150 is provided, via step 212. Step 212 includes attaching the bottom surface 153 of the mirror 150 to the top surface 123 such that the mirror 150 is optically coupled with the laser 140. The reflective surface 152 not only faces the light emitting surface 144 of the laser 140, but is also at the desired height with respect to the portion 144 which emits light. More specifically, the reflective surface 152 is aligned to the laser 140 such that the region 144 that emits light resides at the focal point of the parabola. In some embodiments, the mirror 150 and laser 140 are aligned to not more than one micron of their desired locations. For example, the mirror 150 and laser 140 are aligned such that the portion of the bottom surface 153 of the mirror 150 that is affixed to the top surface 123 is within one micron of the desired offset distance from the bottom surface 146 of the laser 140. In other embodiments, the mirror 150 and laser 140 are aligned to not more than one-half micron of their desired locations. For example, the mirror 150 and laser 140 are aligned such that the portion of the bottom surface 153 of the mirror 150 that is affixed to the top surface 123 is within one-half micron of the desired offset distance from the bottom surface 146 of the laser 140.

Using the method 200, the EAMR head 100 may be fabricated. In particular, alignment between the laser 140 and mirror 150 that is within the desired tolerances may be achieved. As a result, the EAMR head 100 may have improved optical coupling and performance.

Figure 6:
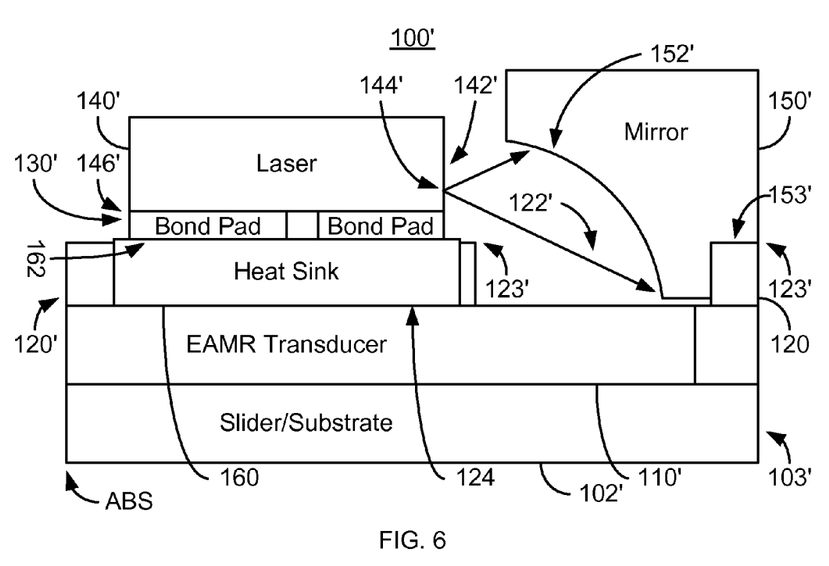
FIG. 6 is a diagram depicting an exemplary embodiment of an EAMR head.

FIG. 6 is a diagram depicting a side view of an exemplary embodiment of an EAMR head 100'. For clarity, FIG. 6 is not to scale. In the embodiment shown in FIG. 6, certain components are shown. However, the EAMR head 100' may include other components, such as a read transducer (not shown). Similarly, only single components are shown. However, in other embodiments, multiple components, such as multiple EAMR transducers, lasers, and/or mirrors may be used.

The EAMR head 100' is analogous to the EAMR head 100 and thus includes analogous components. For example, the EAMR head 100' includes a slider 102'having a back side 103', EAMR transducer 110', top layer 120' having mirror well 122' therein and top surface 123', bond pads 130', laser 140' and mirror 150' corresponding to the slider 102 having the back side 103, EAMR transducer 110, top layer 120 having mirror well 122 therein and top surface 123, bond pads 130, laser 140 and mirror 150, respectively. Further, the laser 140' includes light-emitting surface 142', region 144' that emits light, and bottom surface 146' that correspond to the light-emitting surface 142, region 144, and bottom surface 146, respectively. The mirror 150' includes reflective surface 152' and bottom surface 153' that correspond to the reflective surface 152 and bottom surface 153, respectively.

In addition, the top layer 120' includes a heat sink cavity 124. The EAMR head 100' includes a heat sink 160 having a top surface 162. The heat sink 160 resides in the heat sink cavity 124 and may be used to control the temperature of the laser 140'. In the embodiment shown, the heat sink 160 fills the heat sink cavity 124. However, in another embodiment, this may not be the case. The heat sink 160 includes a thermally conductive material, which may be used to carry heat away from the laser 140'. For example, the heat sink 160 may include Cu. In addition, although the heat sink 160 is shown as adjoining the EAMR transducer 110', another layer may be interposed between the heat sink 160 and the EAMR transducer 110'. In the embodiment shown, the top surface 162 of the heat sink that is substantially coplanar with the top surface 123' of the top layer 120'. However, there may be some offset. In some embodiments, this offset is not more than 0.1 micron. In some such embodiments, the offset does not exceed seventy nanometers. Further, variations in the offset of the top surface 162 of the heat sink 160 from the top surface 123' are significantly smaller than the offset itself.

The EAMR head 100' shares the benefits of the EAMR head 100. In particular, the region 144' of the laser 140' is better aligned to the reflective surface 152' of the mirror 150'. Consequently, optical efficiency of the EAMR head 100' is enhanced. In addition, the heat sink 160 is provided. As a result, temperature of the laser 140' may be better controlled to prevent the laser 140' from overheating. Thus, the performance and reliability of the EAMR head 100' may be improved.

Figure 7:
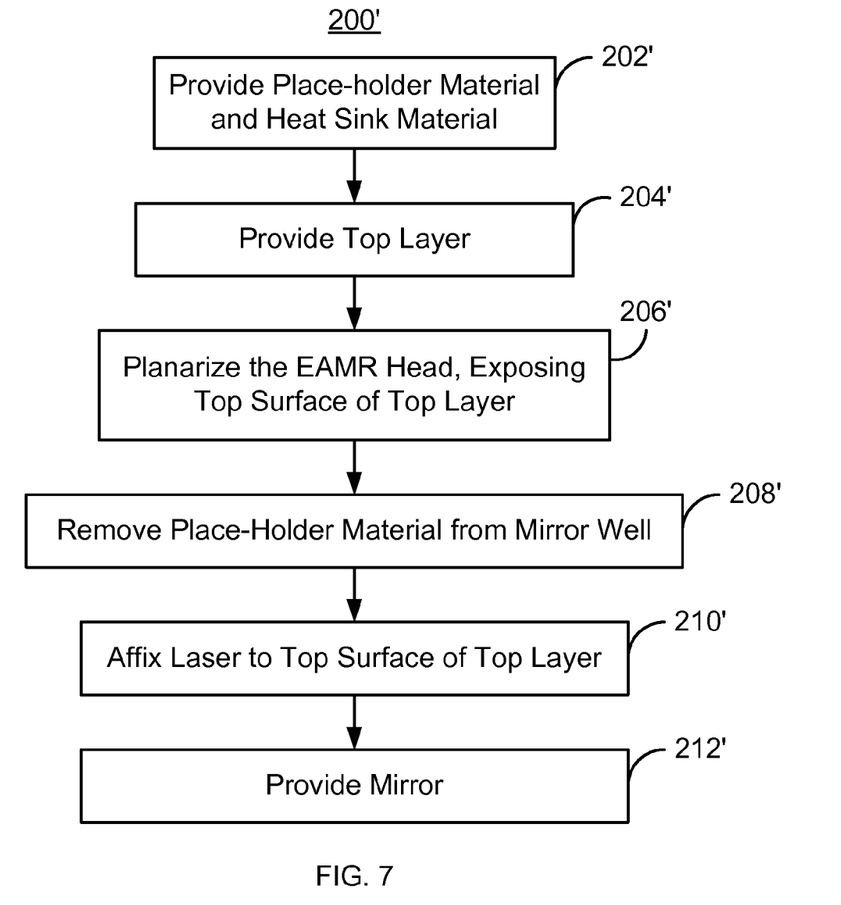
FIG. 7 is a flow chart depicting an exemplary embodiment of a method for fabricating an EAMR head.

FIG. 7 is a flow chart depicting an exemplary embodiment of a method 200' for fabricating an EAMR head. Although certain steps are shown, some steps may be omitted, interleaved, performed in another order, and/or combined. The EAMR head being fabricated may be part of a merged head, each of which includes an EAMR write transducer, a read transducer (not shown) and resides on a slider. Each EAMR head has at least one EAMR transducer on the slider. Thus, the EAMR transducer is fabricated on the substrate, or slider. The EAMR transducer includes optical components, such as gratings, waveguides, and near-field transducers (NFTs), as well as magnetic components such as poles, shields, and coils. The method 200' is described in the context of providing a single EAMR head. However, the method 200' may be used in providing multiple EAMR heads substantially simultaneously. The method 200' is also described in the context of providing particular layers and components. However, the layers and components may include sublayers and subcomponents, respectively. For simplicity, the method 200' is described in the context of the EAMR head 100' and commences after fabrication of the EAMR transducer 110'. However, the method 200' may be used in fabricating another EAMR head.

Referring to FIGS. 6-7, a place-holder material (not shown in FIG. 6) and heat sink material are provided on a portion of the slider 102', via step 202'. The place-holder material is at least in the location of the mirror well 122'. In some embodiments, the heat sink material is deposited in the same deposition step as the place-holder material. Thus, the heat sink and place-holder material may be the same. Alternatively, the heat sink material may be deposited separately from the place-holder material. In such an embodiment, the heat sink material may be the same as or different from the place-holder material. In some embodiments, the place-holder material and heat sink material are both wet-etchable. If the heat sink material and place-holder material are the same, then they are desired to be thermally conductive. For example, the heat sink material and place-holder material may include copper. Step 202' may include depositing the heat sink material and the place-holder material only in the desired regions. Alternatively, the heat sink material and place-holder material might be blanket plated, then removed in the regions from which the place-holder material is not desired. In some embodiments, the place-holder material is provided on an ARC layer in the region of the mirror well 122'.

The top layer 120' is provided on the slider, via step 204'. In some embodiments, step 204' is performed after step 202'. Thus, a portion of the top layer 120' may cover the place-holder material and the heat sink material. The place-holder material naturally forms the mirror well 122'. The heat sink material naturally forms the heat sink cavity 126. In other embodiments, the top layer 120' may be deposited and the mirror well 122' and heat sink cavity 124 formed prior to deposition of the place-holder material and heat sink material.

The EAMR head 100' is planarized, exposing the top surface 123' of the top layer 120', via step 206'. Step 206' may include performing a CMP of the EAMR head 100'. The top surface 123' of the top layer is, therefore substantially flat. In addition, removal of some of the top layer 120' in step 206' exposes a surface of the place-holder material and the heat sink material. Thus, the heat sink 160 may be formed. In addition, the top surface 162 of the heat sink 160 is in proximity to the top surface 123'. In some embodiments, they surfaces 162 and 123' are substantially coplanar.

The place-holder material is removed from the mirror well, via step 208'. In some embodiments, step 208' includes wet etching the place-holder material. In addition, excess place-holder material may be removed from other undesired locations. However, the heat sink 160 is covered by a mask to prevent its removal in step 208'. In addition if there are any other locations where the place-holder material is desired, the place-holder material is covered by a mask. Wet etching the place-holder material may aid in ensuring that the bottom of the mirror well 122' is flat. However, in another embodiment, the place-holder material may be removed in another manner.

The laser 140' is affixed to the top surface 123' of the top layer 120', via step 210'. Step 210' may include providing bond pads 130' on the top surface 162 of the heat sink 160 and affixing the laser 140' to the bond pads. The mirror 150' is provided, via step 212'. Step 212' includes attaching the bottom surface 153' of the mirror 150' to the top surface 123' such that the mirror 150' is optically coupled with the laser 140'. The reflective surface 152' not only faces the light emitting surface 144' of the laser 140', but is also at the desired height with respect to the portion 144' which emits light. In some embodiments, the reflective surface 152' is aligned to the laser 140' such that the region 144' that emits light resides at the focal point of the parabola. In some embodiments, the mirror 150' and laser 140' are aligned to not more than one micron of their desired locations. For example, the mirror 150' and laser 140' are aligned such that the portion of the bottom surface 153' of the mirror 150' that is affixed to the top surface 123' is within one micron of the desired offset distance from the bottom surface 146' of the laser 140'. In other embodiments, the mirror 150' and laser 140' are aligned such that the portion of the bottom surface 153' of the mirror 150' that is affixed to the top surface 123' is within one-half micron of the desired offset distance from the bottom surface 146' of the laser 140'.

Using the method 200', the EAMR head 100' may be fabricated. In particular, alignment between the laser 140' and mirror 150' that is within the desired tolerances may be achieved. As a result, the EAMR head 100' may have improved optical coupling and performance.

Figure 8:
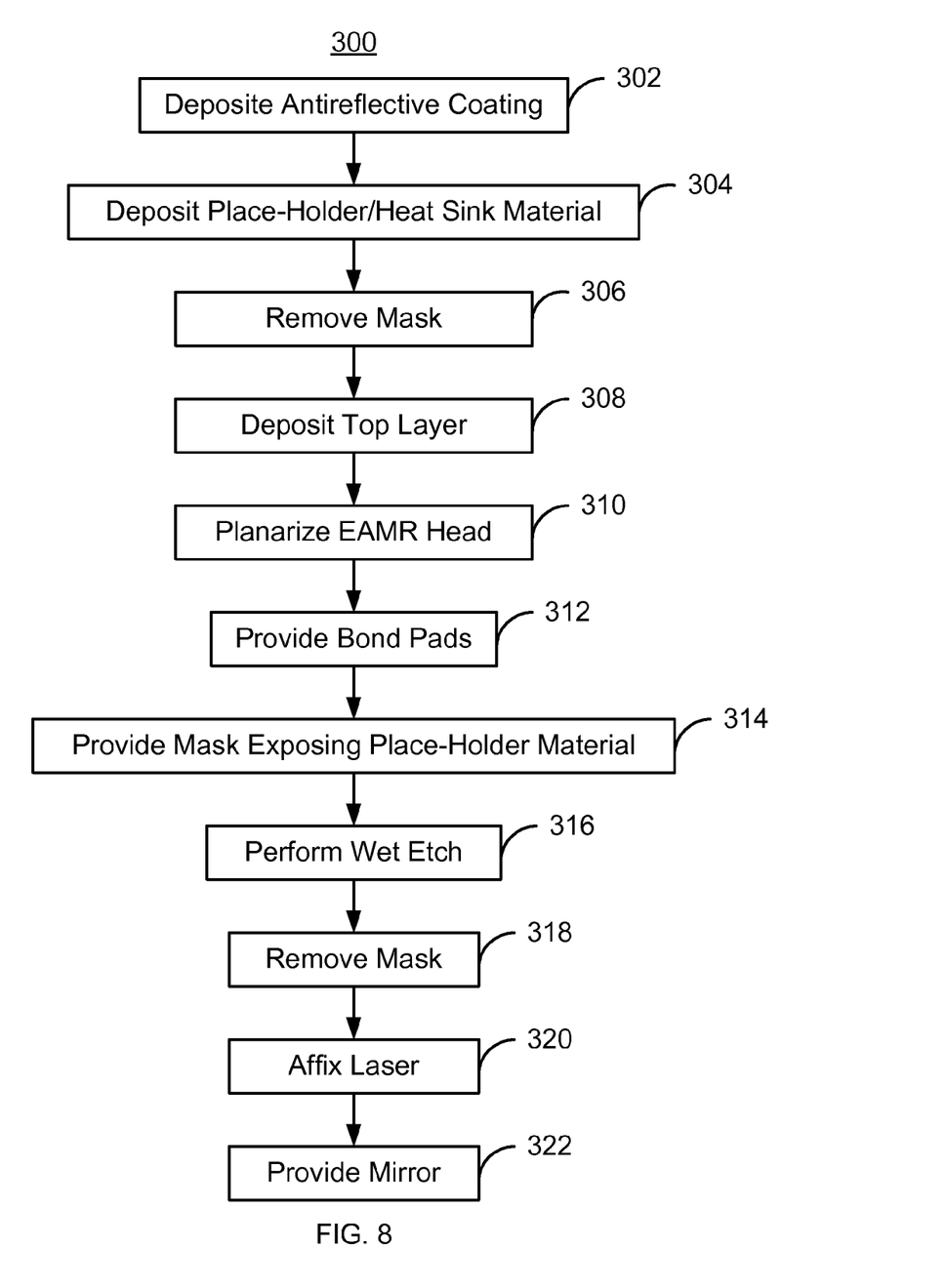
FIG. 8 is a flow chart depicting an exemplary embodiment of a method for fabricating an EAMR head.

FIG. 8 is a flow chart depicting an exemplary embodiment of a method 300 for fabricating an EAMR head. Although certain steps are shown, some steps may be omitted, interleaved, performed in another order, and/or combined. FIGS. 9-17 are diagrams depicting an exemplary embodiment of an EAMR head during fabrication using the method 300. For clarity, FIGS. 9-17 are not to scale. Further, for simplicity, not all components are labeled in FIGS. 9-17. Referring to FIGS. 8-17, the method 300 is described in the context of the components shown. However, the method 300 may be used to form other enclosure layer(s) (not shown). Although the method 300 is described in the context of a single EAMR head depicted in FIGS. 9-17, multiple EAMR heads are typically fabricated in parallel. The EAMR head 400 being fabricated may be part of a merged head, each of which includes an EAMR write transducer 410, a read transducer (not shown) and resides on a slider. Each EAMR head has at least one EAMR transducer on the slider. Thus, the EAMR transducer 410 is fabricated on the substrate, or slider. The EAMR transducer 410 includes optical components, such as gratings, waveguides, and near-field transducers (NFTs), as well as magnetic components such as poles, shields, and coils some of which may not be shown.

Figure 9:
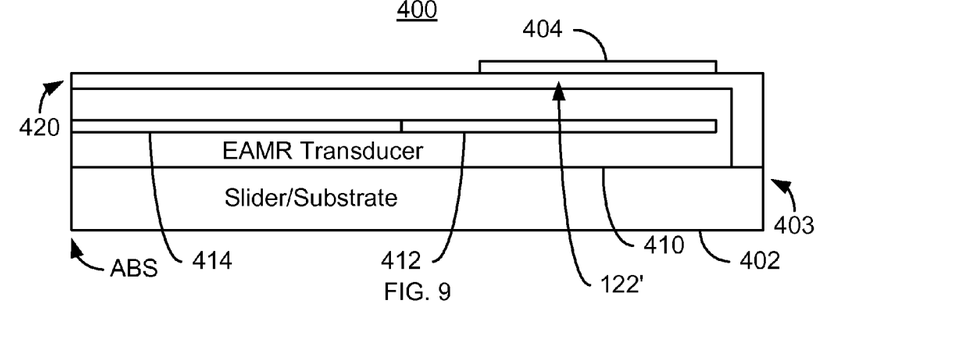
FIGS. 9-17 are diagrams depicting an exemplary embodiment of an EAMR head during fabrication.

An ARC layer is deposited on a portion of the slider, via step 302. In some embodiments, step 302 includes masking a portion of the slider, depositing the ARC layer, and then stripping the mask. In other embodiments, the ARC layer may be blanket deposited and then removed from the regions in which the ARC layer is not desired. FIG. 9 depicts the EAMR transducer 400 after step 302 is performed. Thus, the slider 402 is shown. The EAMR head 400 may also include a read transducer (not shown). The slider 402 has an ABS and a back side 403 to which the slider 402 is mounted to the suspension (not shown). Also shown is the EAMR transducer 410 on the slider 402. In some embodiments, the EAMR transducer 410 is fabricated on the slider/substrate 402. The EAMR transducer 410 includes a grating 412 and a waveguide 414. The EAMR transducer 410 also includes magnetic components, such as pole(s), coil(s) and/or shield(s), which are not shown. A layer 420 on the EAMR transducer 410 is shown. The layer 420 may be an overcoat layer. Also shown is the ARC layer 404. In other embodiments, the ARC layer 404 might be omitted. However, the surface roughness of the underlying surface of the slider 402 is desired to be good. For example, in some embodiments, the surface roughness is such that the variation in the surface is not more than five nanometers.

Figure 10:
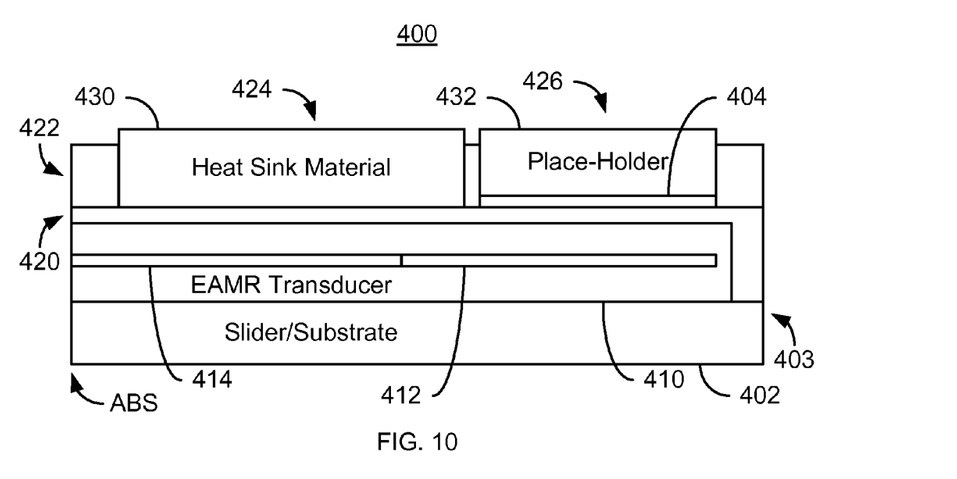
Figure 11:
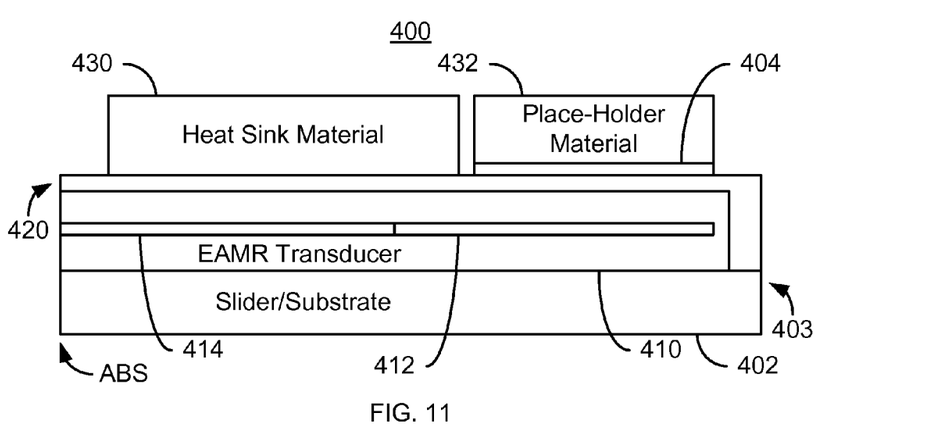

The place-holder and heat sink material are provided, via step 304. In some embodiments, the place-holder and heat sink material are the same and are wet-etchable material(s). A first portion of the wet etchable-material residing on the portion of the slider 402 covered by the ARC layer 404. This first portion of the material is a place-holder material for forming the mirror well. A second portion of the wet-etchable material is physically separated from the first portion of the wet-etchable material. This second portion is used in forming the heat sink cavity and/or the heat sink. This portion of the wet-etchable material corresponds to the heat sink material. Step 304 may be carried out by providing a mask having apertures in the desired regions of the EAMR head 400. The place-holder and heat sink materials may then be provided in the appropriate apertures. FIG. 10 depicts the EAMR head 400 after step 306. Thus, a mask 422 having apertures 424 and 426 are shown. The heat sink material 430 and place-holder material 432 in apertures 424 and 426, respectively, are also shown. In the embodiment shown, the heat sink material 430 and place-holder material 432 are formed of the same material, such as Cu. Thus, the heat sink material 430 and place-holder material 432 may be plated in the same step. The mask 422 is removed, via step 306. For example, the mask 422 may be stripped in step 306. FIG. 11 depicts the EAMR transducer 400 after step 306 is completed. Thus, the mask 422 has been removed.

Figure 12:
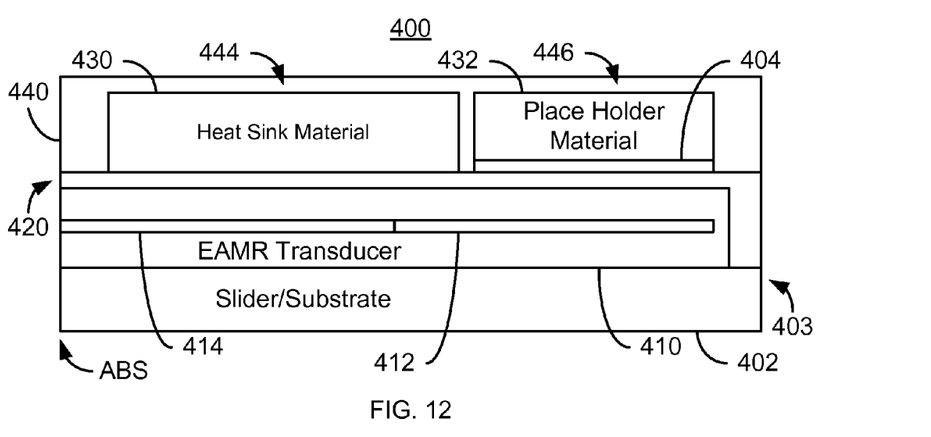

A top layer is provided on the slider 402, via step 308. The top layer covers the wet-etchable material forming the heat sink material 430 and the place-holder material 432. Step 402 may include depositing a material such as alumina which may be planarized. FIG. 12 depicts the EAMR head 400 after step 306 is performed. The top layer 440 is shown. The top layer 440 has a mirror well 446 and a heat sink cavity 444 therein. The place-holder material 432 is in the mirror well 446. The heat sink material 430 is in the heat sink cavity 444.

Figure 13:
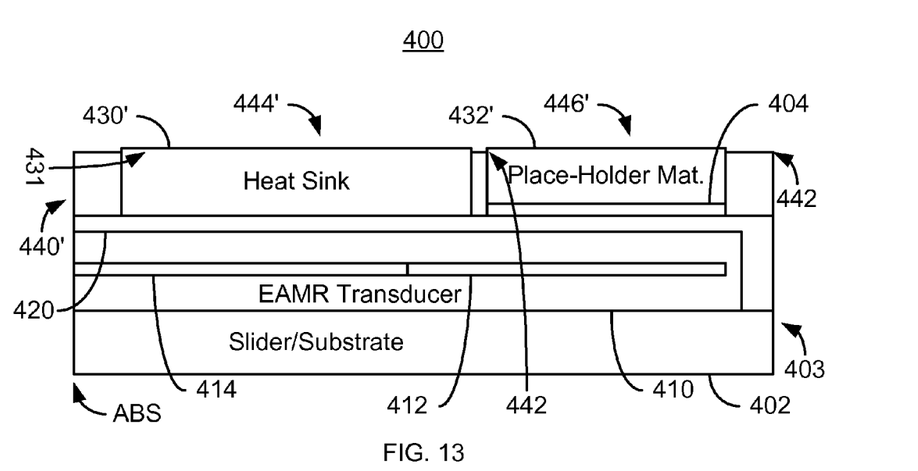

The EAMR head 400 undergoes planarizing, via step 310. Step 310 includes performing a CMP. Thus, a new top surface of the top layer 440 is exposed. FIG. 13 depicts the EAMR head 400 after step 310 is completed. A portion of the top layer 440' has been removed. Thus, a top surface 442 of the top layer 440' has been exposed. Heat sink cavity 444' and mirror well 446' have also been formed. In addition, a portion of the heat sink material 430' and place-holder material 432' may have been removed. Thus, heat sink 430' may remain. Note that the top surface 431 of the heat sink 430' has also been exposed. The top surface 431 of the heat sink 430' and the top surface 442 of the top layer 440' are substantially flat and coplanar. However, as shown in FIG. 13, the top surfaces 431 and 442 may not be in exactly the same plane. For example, the top surface 431 of the heat sink 430' may be within 0.1 micron of the top surface 442 of the top layer 440'.

Figure 14:
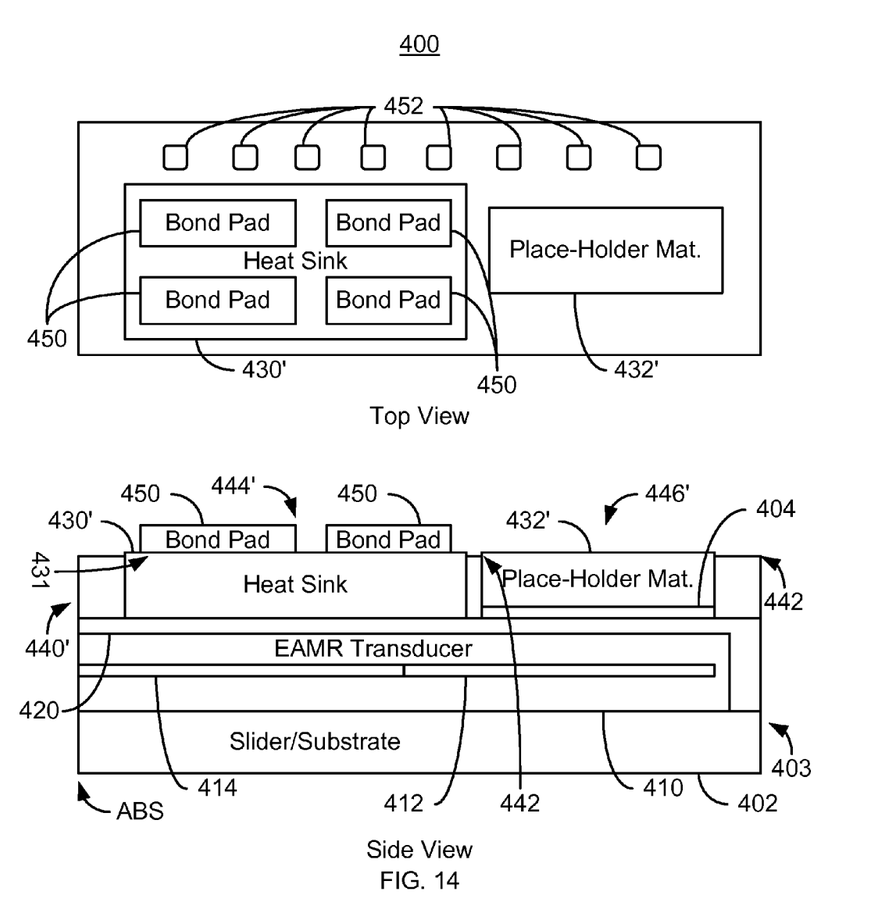

Bond pads are provided, via step 312. FIG. 14 depicts the EAMR head 400 after step 312 is performed. In FIG. 14, both top and side views are shown. Thus, bond pads 450 have been provided on the heat sink 430'. Also shown are contacts 452.

Figure 15:
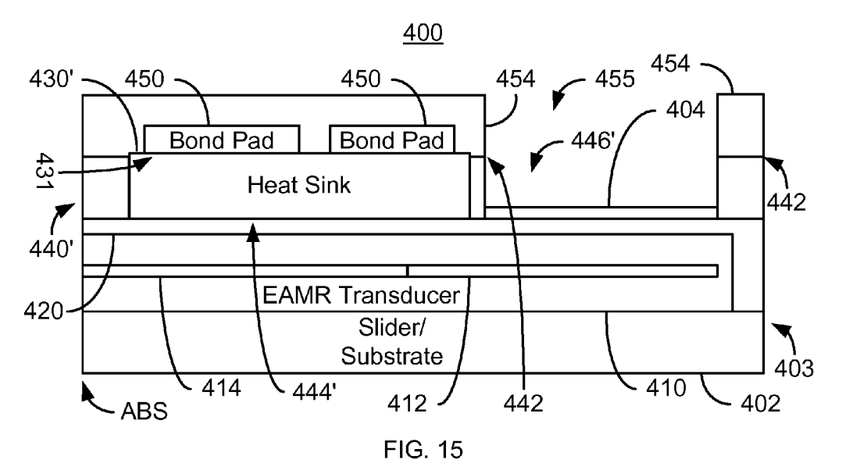

Removal of the place-holder material 432' is desired. Consequently, a mask is provided, via step 314. The mask exposed the place-holder material 432', but does not expose other regions that are desired and which are removable via the etching process to be used. The place-holder material is removed using the appropriate etch, via step 316. In some embodiments, step 316 includes performing a wet-etch capable of removing the place-holder material 432'. For example, a wet etch of copper may be performed in step 316. FIG. 15 depicts the EAMR head 400 after step 316 is performed. Consequently, mask 454 is shown. The mask 434 includes an aperture 455 that exposed place-holder material 432'. Because step 316 has been performed, the place-holder material 432' has been removed, leaving the mirror well 446'. Further, the heat sink 430' and bond pads 450 remain as the mask 454 has prevented the etchant from removing the heat sink 430'. The mask is then removed, via step 318. Step 318 may include performing a resist strip.

Figure 16:
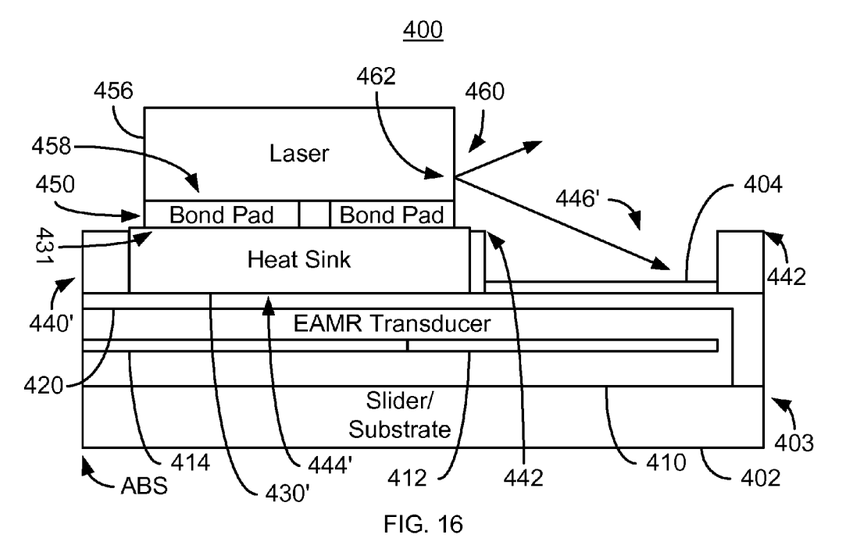

A laser is affixed to the bond pads, via step 320. For example, step 320 may include solder bonding the laser to the bond pads 450. FIG. 16 depicts the EAMR head 400 after step 320 is performed. Thus, a laser 456 has been provided. The laser 456 has a bottom surface 458, a light emitting surface 460, and region 462 that actually emits light. The light emitting surface 460, and thus region 462 face the mirror well 446'. In the embodiment shown, the laser 456 may be an edge-emitting laser diode. Because the top surface 431 of the heat sink 430' and the thickness of the bond pads 450 are known to within acceptable variations, position of the bottom surface 458 is known to within these variations.

Figure 17:
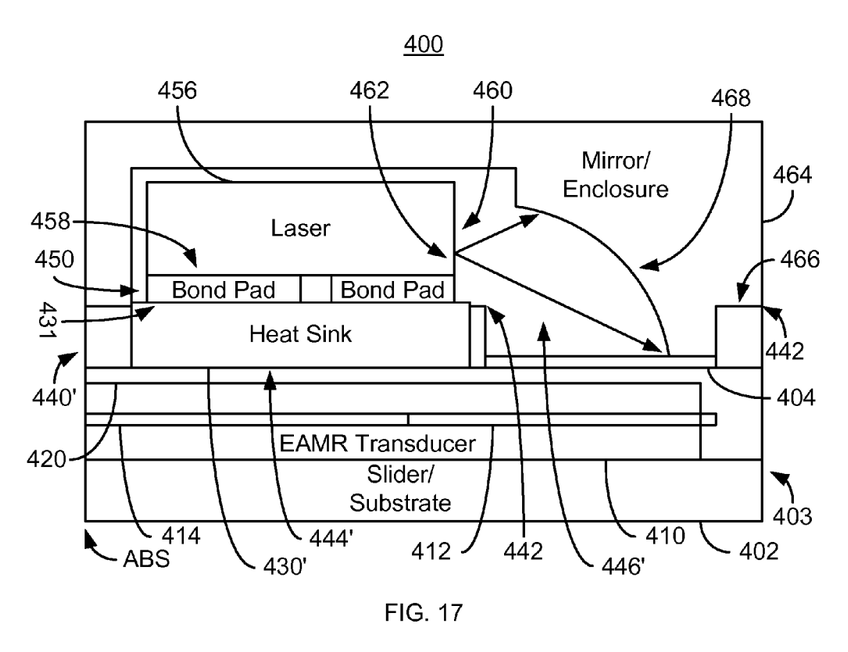

A mirror is optically coupled with the laser, via step 322. Step 322 may include aligning the mirror and bonding a portion of the mirror to the top surface 442. In some embodiments, the mirror is part of an enclosure that encapsulates the laser 456. However, in other embodiments, the mirror may be a separate component. In such embodiments, an encapsulating layer that encloses the mirror and laser 456 may also be provided. FIG. 17 depicts the EAMR head 400 after step 322 is performed. In the embodiments shown, the mirror is part of an enclosure layer 464. The mirror/enclosure layer 464 includes a reflective surface 468 that faces the light emitting surface 460 of the laser 456. The mirror/enclosure layer 464 has a bottom surface 466, a portion of which is attached to the top surface 442 of the top layer 404. A portion of the mirror/enclosure layer 464 that includes part of the reflective surface 468 reside in the mirror well 446'. In some embodiments, the mirror/enclosure layer 464 and laser 456 are aligned to within not more than one micron of their desired locations. For example, the mirror/enclosure layer 464 and laser 456 may be aligned such that the portion of the bottom surface 466 of the mirror/enclosure layer 464 that is affixed to the top surface 442 is within one micron of the desired offset distance from the bottom surface 458 of the laser 456. In other embodiments, the mirror/enclosure layer 464 and laser 456 are aligned to not more than one-half micron of their desired locations. Stated differently, variations in the distance between the bottom surface 458 of the laser 456 and the bottom surface 466 of the mirror//enclosure layer 464 may be not more than one-half micron. The location of the light-emitting region 462 with respect to the bottom surface 458 is known. Similarly, the location of the reflective surface 488 with respect to the bottom surface 466 is known. As a result, aligning the bottom surfaces 458 and 466 results in the reflective surface 466 being aligned with the light-emitting region 462. In some embodiments, this translates to the light emitting region 462 being within one micron, or one-half micron, of the focal point of the reflective surface 468.

Using the method 300, the EAMR head 400 may be fabricated. In particular, alignment between the light-emitting region 462 of the laser 456 and reflective surface 468 of the mirror/enclosure layer 464 to within the desired tolerances may be achieved. As a result, the EAMR head 400 may have improved performance.

We claim:

1. An energy assisted magnetic recording (EAMR) head comprising:
    a slider;
    an EAMR transducer coupled with the slider;
    a top layer on the slider, the top layer including a mirror well therein and having a substantially flat top surface;
    a laser including a light-emitting surface, the laser being coupled to the top surface of the top layer external to the mirror well; and
    a mirror optically coupled with the laser, the mirror having a bottom surface and a reflective surface facing the light-emitting surface of the laser, a portion of the bottom surface being affixed to the top surface of the top layer, a portion of the mirror residing in the mirror well.

2. The EAMR head of claim 1 wherein the top layer further includes a heat sink cavity therein, the EAMR head further comprising:
    a heat sink residing in the heat sink cavity and having a heat sink top surface being substantially coplanar with and forming a portion of the top surface of the top layer, the laser being coupled to the heat sink.

3. The EAMR head of claim 1 wherein the laser includes a laser bottom surface and wherein the laser bottom surface is within an offset distance of the portion of the bottom surface of the mirror affixed to the top layer, a variation of the offset distance being not more than one micron.

4. The EAMR head of claim 3 wherein the variation of the offset distance is not more than one-half micron.

5. The EAMR head of claim 1 further comprising:
    a bond pad, the laser being affixed to the bond pad.

6. The EAMR head of claim 1 further comprising:
    an antireflective coating on the slider forming a bottom of the mirror-well.

7. The EAMR head of claim 1 further comprising:
    an enclosure layer for enclosing the mirror and the laser.

8. The EAMR head of claim 1 wherein the reflective surface is a concave, parabolic reflective surface.

9. The EAMR head of claim 1 wherein the EAMR transducer further includes a grating, the top layer residing on a portion of the grating.

* * * * *